United States Patent [19]

Holmstrom

[11] Patent Number: 5,617,380

[45] Date of Patent: Apr. 1, 1997

[54] APPARATUS AND METHOD FOR DRIVE MANAGEMENT FOR MULTI-PASS STORAGE DEVICES

[75] Inventor: David Holmstrom, Morgan Hill, Calif.

[73] Assignee: Fujitsu Limited, Kawasaki, Japan

[21] Appl. No.: 368,605

[22] Filed: Jan. 4, 1995

[51] Int. Cl.$^6$ .................................................. G11B 13/00
[52] U.S. Cl. ............................ 369/14; 369/275.1; 369/54
[58] Field of Search ................................... 369/14, 275.1, 369/54, 275.2, 275.3

[56] References Cited

U.S. PATENT DOCUMENTS

| | | | |
|---|---|---|---|
| 5,124,963 | 6/1992 | Ando | 369/54 X |
| 5,349,577 | 9/1994 | Mikamo | 369/54 X |
| 5,367,510 | 11/1994 | Ando | 369/54 X |
| 5,406,538 | 4/1995 | Hotori et al. | 369/54 X |

FOREIGN PATENT DOCUMENTS 5-266594  10/1993  Japan .

*Primary Examiner*—David C. Nelms
*Assistant Examiner*—Huan Hoang
*Attorney, Agent, or Firm*—Edward B. Weller; Mark C. Terrano

[57] ABSTRACT

An optical recording system writes data on an optical disk that has a user data area having a plurality of sectors and that has a map having first and second indicators corresponding to a portion of the plurality of sectors. The first indicator has a first logic state indicating that a corresponding sector contains data and has a second logic state indicating that the corresponding sector does not contain data. The second indicator has a first logic state indicating that the corresponding sector is to be erased. A recorder is coupled to the optical disk for erasing data and the indicators from the sectors and the map, respectively, in response to an erase command. The recorder writes data and the indicators on the sectors and the map, respectively, in response to a write command. A processor coupled to the optical storage medium and the recorder provides both the erase command and the write command in response to the first indicator being in the first logic state for a two-pass write, provides the write command in response to the first indicator being in the second logic state for a one-pass write, and provides the erase command in response to the second indicator being in the first logic state during an off-line data management phase. A memory stores a copy of the map having third and fourth indicators corresponding to a portion of the plurality of sectors, the third indicator having a first logic state indicating that a corresponding sector contains stored data and having a second logic state indicating that the corresponding sector does not contain stored data, the fourth indicator having a first logic state indicating that a corresponding sector is to be erased during the off-line data management phase.

12 Claims, 11 Drawing Sheets

5,617,380

APPARATUS AND METHOD FOR DRIVE MANAGEMENT FOR MULTI-PASS STORAGE DEVICES

FIELD OF THE INVENTION

This invention relates to storing data on magneto-optical storage devices, and more particularly to managing such storing of data.

BACKGROUND OF THE INVENTION

Magnetic storage is the most common medium for storing binary and analog data. Re-writeable optical storage has only recently entered the mainstream of computing. The most common system currently in the consumer market is magneto-optical system. Magneto-optical systems record data magnetically and optically in combination and read data optically. Magneto-optical storage provides a more robust storage of binary data that has less degradation of the written data than magnetic storage.

For magnetic recording, data previously recorded on the magnetic medium is erased concurrently with writing data on the medium as a one-pass process. In contrast, for magneto-optical recording, a two-pass process is required for writing data. During a first pass, the magneto-optical medium is reset by erasing data from the medium. During a second pass, the magneto-optical medium is set by writing data to the medium. During the erase pass, the entire region is reset by applying a magnetic field ("north" up) to the medium and then continuous applying high power light from a laser to the medium. In this pass, all data bits are reset to "0". During the write pass, the magnetic field is switched to the opposite polarity ("north" down) and the laser is pulsed to write data only where the specific bits are to be "1". This combination gives the desired binary data (e.g., 0100111).

Unlike magnetic recording systems which allows changes in the magnetic field to occur rapidly, magneto-optical recording systems require a larger magnetic field and have a magnet that is physically further away from the active layer of the recording medium. Changing the magnetic field rapidly in the magneto-optical system, as is done in magnetic recording systems, increases the power requirements and may exceed the physical limitations of the medium. One method for overcoming this problem is to increase the sensitivity of the magneto-optical medium and slow the recording process, but this compromises the data integrity features, significantly limits performance, and is not compatible with conventional recording standards.

Another method for overcoming the two pass process has been to reset the bits before data is written to the disk, in a process commonly known as pre-erase. Pre-erasing the medium is handled by the host computer system through special device drivers and with non-standard calls to the optical disk drive. When the data is overwritten or needs to be erased, the host computer system must slow down or multi-thread to manage the data phase of the drive to thereby increase system overhead. Also, formats other than conventional data structures are required. In addition, because non-standard calls are used, special device drivers are required at a significantly increased cost and overhead. Finally, because there is no margin for hardware or software failure, all data on a disk is at risk during the pre-erase phase.

SUMMARY OF THE INVENTION

In the present invention, a method and apparatus writes data on an optical storage medium that has a user data area having a plurality of sectors and that has a map having first and second indicators corresponding to a portion of the plurality of sectors. The first indicator has a first logic state indicating that a corresponding sector contains data and has a second logic state indicating that the corresponding sector does not contain data. The second indicator has a first logic state indicating that the corresponding sector is to be erased.

A memory stores a copy of the map. A recorder is coupled to the optical storage medium for erasing data and the indicators from the sectors and the map, respectively, in response to an erase command. The recorder writes data and the indicators on the sectors and the map, respectively, in response to a write command.

A processor coupled to the memory and the recorder provides both the erase command and the write command in response to the first indicator being in the first logic state. The processor provides the write command in response to the first indicator being in the second logic state. The processor provides the erase command in response to the second indicator being in the first logic state.

DETAILED DESCRIPTION OF THE PREFERRED EMBODIMENTS

Figure 1:
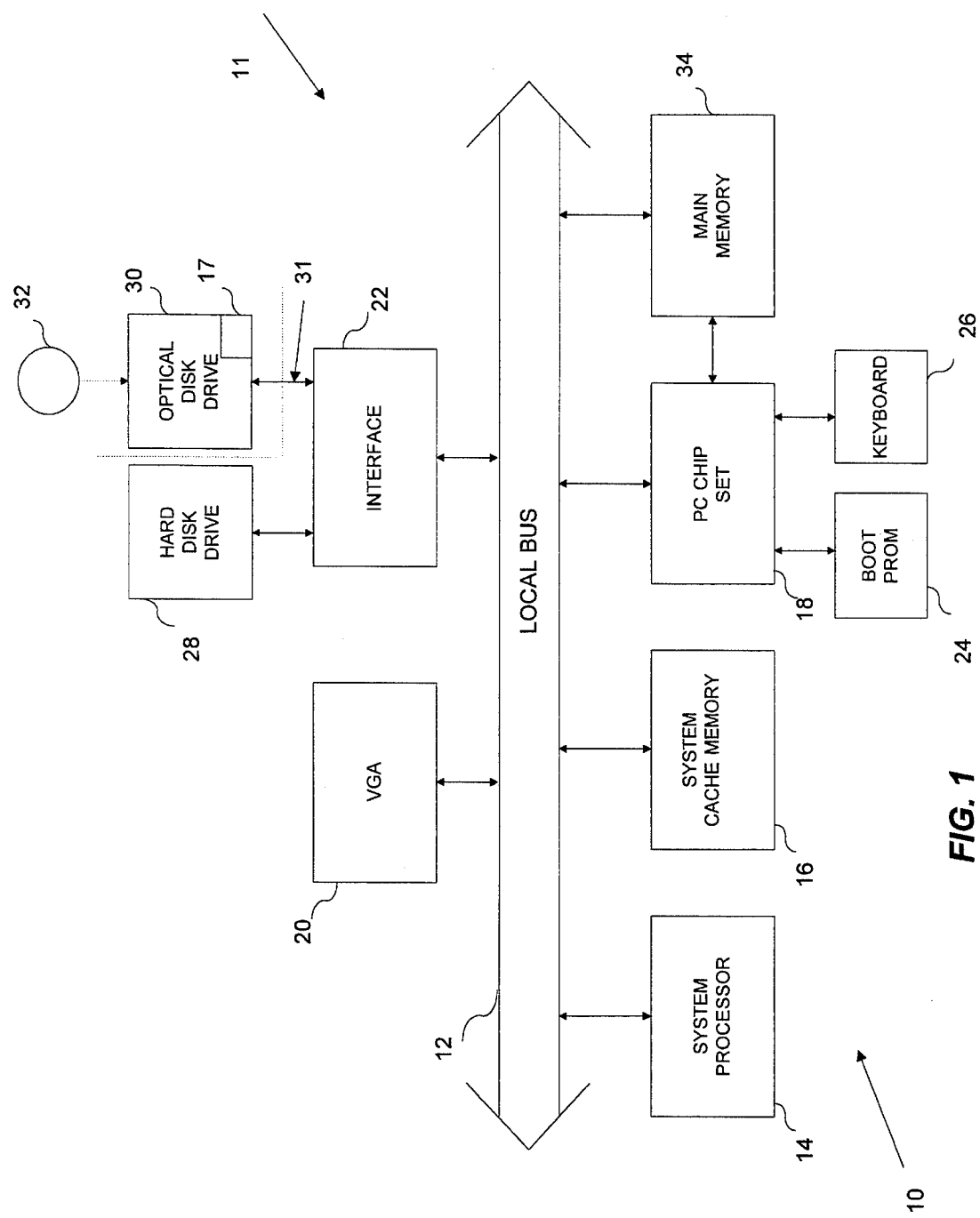
FIG. 1 is a block diagram illustrating a microprocessor system in accordance with the present invention.

Referring to FIG. 1, there is shown a block diagram illustrating a microprocessor system 10 in accordance with the present invention. The microprocessor system 10 has a local bus 12 for interconnecting a system processor 14, a system cache memory 16, a PC chip set 18, a video graphics accelerator (VGA) 20, and a peripheral interface 22. Each of these elements is conventional. The local bus 12 may be, for example, a high speed bus, such as a Video Electronics Standards Association (VESA) bus or a Peripheral Components Interface (PCI). The peripheral interface 22 may be, for example, a small computer system interface (SCSI). The system processor 14 may be, for example, an 80486 processor or a Pentium processor manufactured by Intel Corporation of Santa Clara, Calif. The PC chip set 18 controls the input/output, interrupts, a boot programmable read only memory (PROM) 24, and the local bus 12. The system processor 14 provides system resources to initialize the system and synchronize the input and output.

The system cache memory 16 provides buffering for data transferred from a hard disk drive 28 or an optical medium drive 30 (optical disk drive) and stores frequently used data for faster retrieval or off-line processing. The system cache memory 16 may be, for example, a conventional random access memory (RAM). A host system 11 comprises the system 10 except for the optical medium drive 30.

The chip set 18 is coupled to a conventional keyboard 26 for receiving user inputs. The chip set 18 may also be coupled to a conventional pointing device (not shown), such as a mouse, for receiving user selected commands, such as locating a cursor. The chip set 18 may also be coupled to other conventional input/output (I/O) devices (not shown), such as a mass storage device, a serial input/output (I/O) interface, a display, a parallel input/output (I/O) interface, a network, such as Ethernet, and a real time clock.

The boot PROM 24 for storing the object code for bootup is coupled to the chip set 18. The boot PROM 24 may be, for example, a conventional PROM. The peripheral interface 22 couples a hard disk drive 28 and an optical medium drive 30 to the local bus 12. A data bus 31 couples the peripheral interface 22 to the optical medium drive 30. The optical medium drive 30 includes a cache 17 for storing data and commands related to the optical medium drive 30. The disk drive 28 stores the operating system and application software. The optical medium drive 30 receives an optical recording medium 32 and writes data on or reads data from the medium 32. The optical recording medium 32 may be, for example, a magneto-optical disk. Magneto-optical disks require a two-pass process for writing data thereon. During the first pass, the optical medium drive 30 resets the magneto-optical medium by erasing data from the medium in a conventional manner by applying a magnetic field to the medium and then continuously applying high power light from a laser (not shown) to the medium. During the second pass, the optical medium drive 30 writes data to the medium 32 in a conventional manner by applying a magnetic field having a polarity opposite of the field during an erase and pulsing high power light only when specific bits are to opposite in state from the erased state, e.g. a bit 1 is written when an erased bit is a bit 0. The system processor 14 controls communication with the optical medium drive 30 using software drivers. For simplicity, the operation of the drivers will be described as being part of the operating system. A main memory 34 coupled to the chip set stores the operating system and the application software during system operation.

Figure 2:
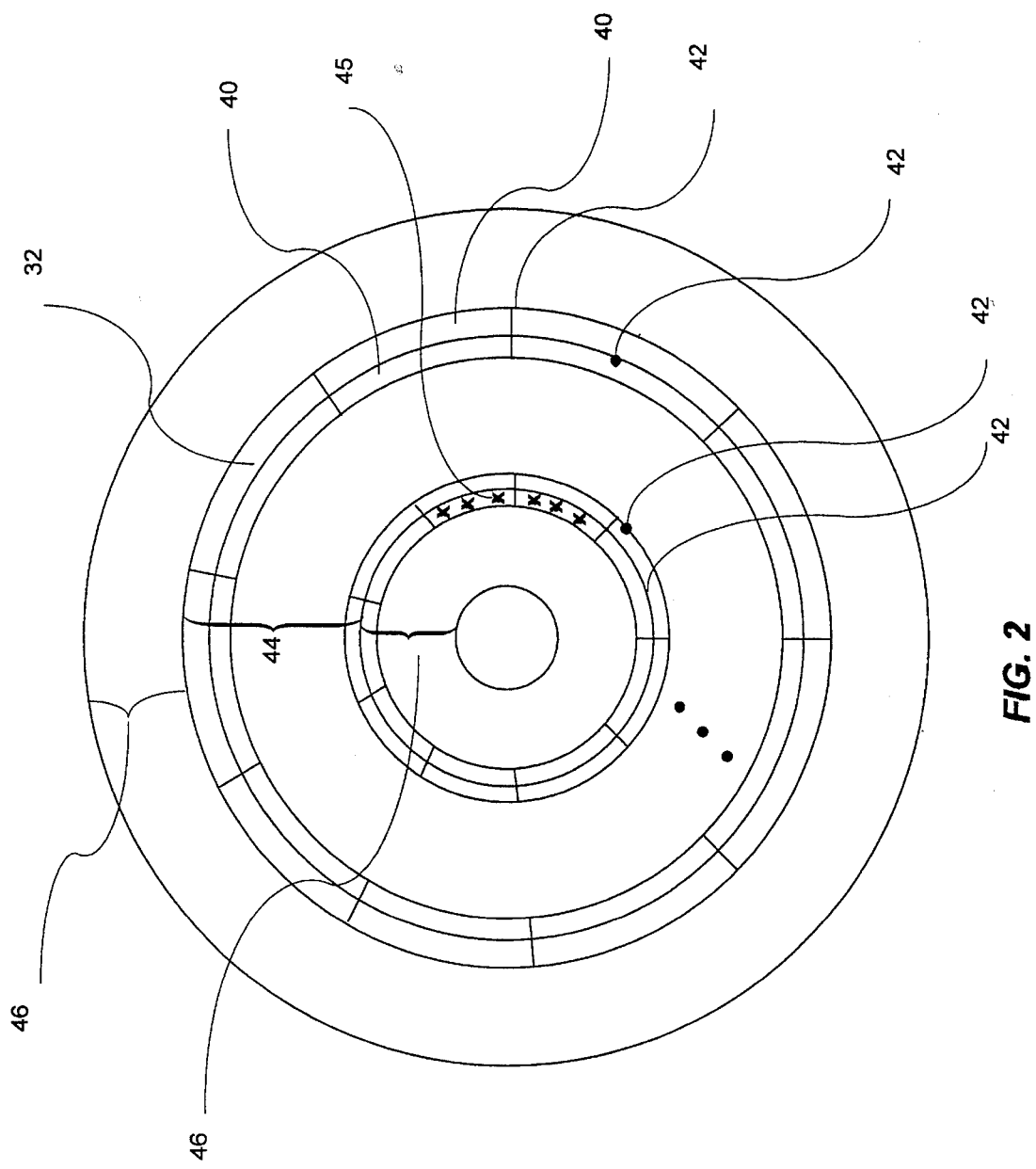
FIG. 2 is a schematic diagram illustrating a magneto-optical storage medium of the microprocessor system of FIG. 1.

Referring to FIG. 2, there is shown a schematic diagram illustrating the magneto-optical storage medium 32. Data is stored on the optical medium 32 in a plurality of sectors 40 arranged in concentric tracks 42. The optical medium drive 30 stores user data in tracks 42 in a user data area 44 that is accessible by the user and stores a map 45 in tracks 42 in a non user data area 46 that is not accessible by the user. Alternatively, the optical medium drive 30 may store the map 45 in the user data area 44.

Figure 3:
FIG. 3 is a schematic diagram illustrating the structure of a map of the microprocessor system of FIG. 1.

Referring to FIG. 3, there is shown a schematic diagram illustrating the structure of the map 45. The map 45 has at least one bit for each sector 40 on the medium 32. For example, in a 230 MB 3.5" magneto-optical format, the user data area 44 is approximately 500,000 sectors and has two bits for each sector, which corresponds to at least 1,000,000 bits of data or 124 kilobytes of data. A sector to-be-erased (TBE) bit indicates that the corresponding sector 40 is to be erased. A valid data bit indicates that the corresponding sector 40 contains data. If a sector 40 contains data, the optical medium drive 30 pre-erases the sector 40 and then writes to the sector 40 for a two-pass write. Conversely, if a sector 40 does not contain data, the optical medium drive 30 writes to the sector 40 without pre-erasing the sector 40 for a one-pass write. The operating system, the device driver, diagnostic software, or the like may designate sectors that the operating system selects to erase, such as sensitive data or sectors no longer in use, by issuing an erase command. The operating system adds the selected sectors to the map 45 by setting the TBE bit of the map 45. The operating system manages the user data area 44 and the non-user data area 46 using the map 45 as a reference.

When the medium 32 is initialized, the operating system allocates a portion of the medium 32 for the map 45. The operating system resets (erases) the entire user data area 44 of the medium 32 and initializes the map 45 by clearing each bit of the map 45. Media certification may be performed as desired, followed by a reset of the user data area 44.

Figure 4:
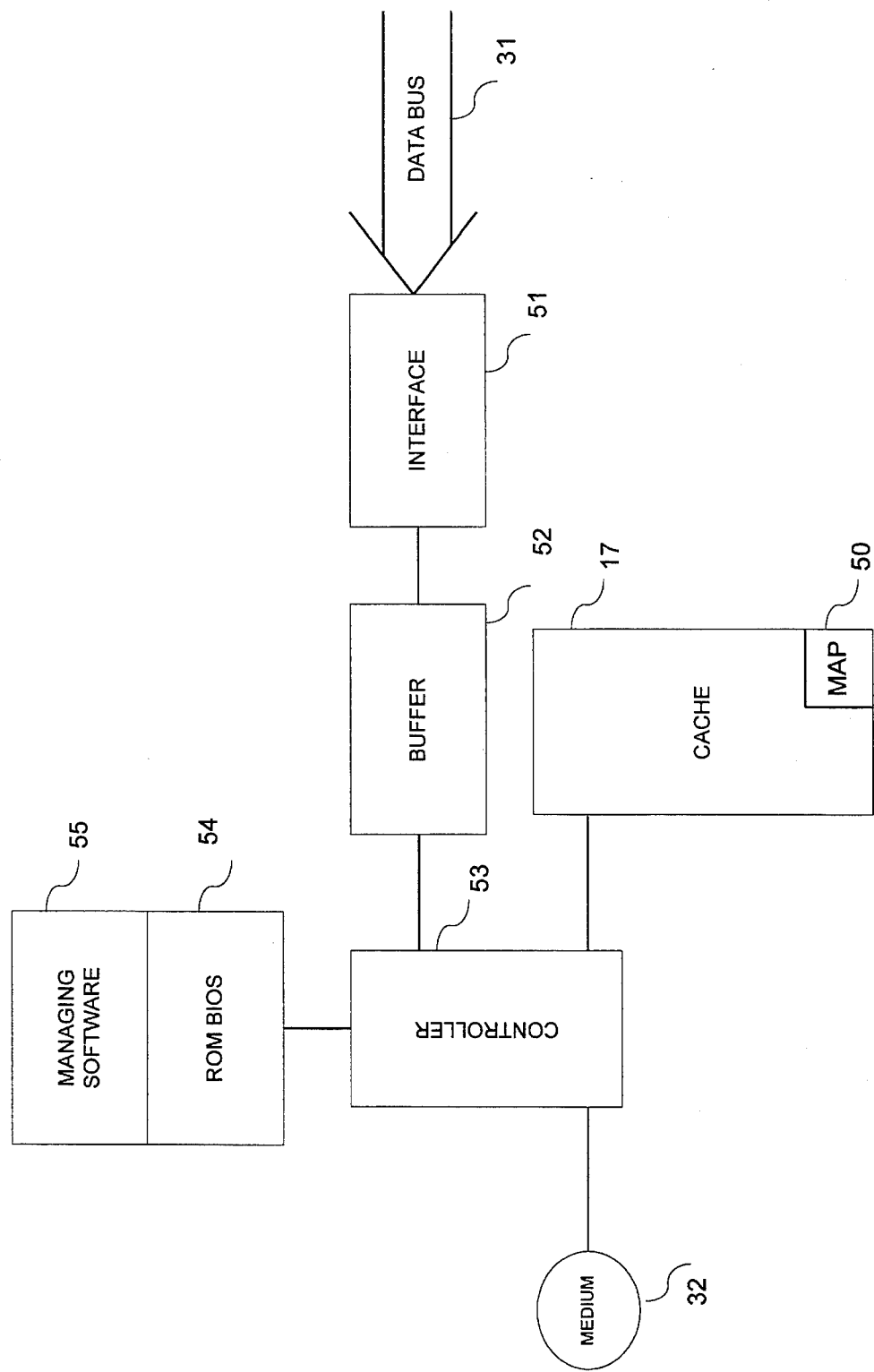
FIG. 4 is a schematic diagram illustrating the structure of a cache memory on the storage medium of the microprocessor system of FIG. 1.

Referring to FIG. 4, there is shown a block diagram illustrating the optical medium drive 30 with the optical storage medium 32 received therein. An interface 51 couples the data bus 31 to a buffer 52 for storing data communicated between the optical storage medium 32 and the data bus 31. A controller 53 controls the transfer of data and commands between the cache 17, the map copy 50, the buffer 52, and the optical storage medium 32. A BIOS read-only memory (ROM) 54 provides managing software 55 to the controller 53 at boot up of the optical medium drive 30.

Figure 5:
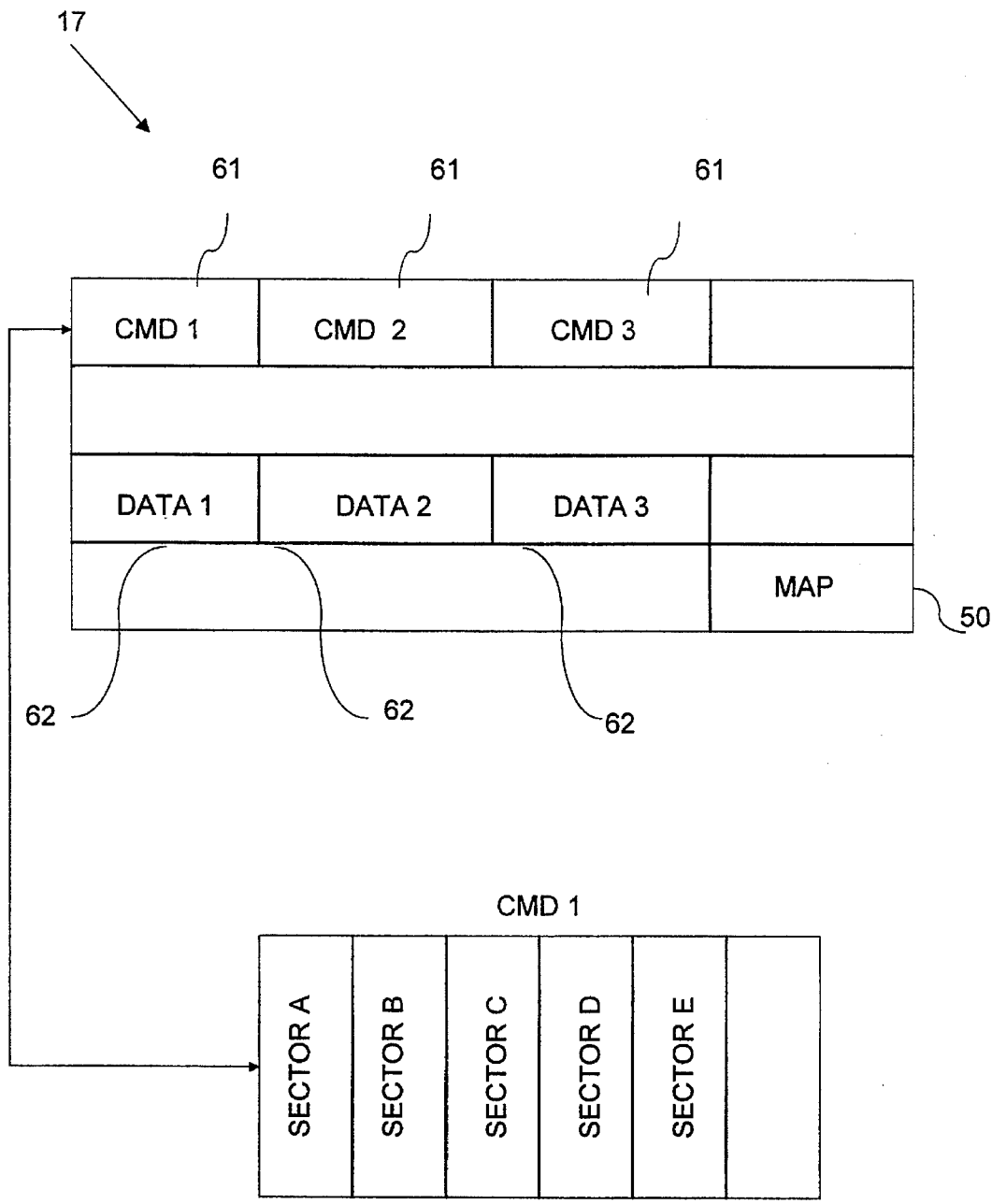
FIG. 5 is a block diagram illustrating the optical medium drive of the microprocessor system of FIG. 1.

Referring to FIG. 5, there is shown a schematic diagram illustrating the structure of the cache 17. The cache 17 includes a map copy 50 of the map 45. Commands 61 and data 62 are retrieved from at least one sector 40 of the medium 32 and stored in the cache 17. The commands 61 and the data 62 may be stored in at least one sector 40 on the medium 32. Such sectors 40 may be in non-consecutive sectors and in different tracks. If a command 61 or data 62 is selected to be erased, the corresponding TBE bits in the map 45 and the map copy 50 are set. Thus, during an erase the map 45 allows the optical medium drive 30 to erase commands 61 and data 62 by the physical sequence of the tracks and sectors of the commands and data as they are stored on the medium 32. For example, if a first command 61 is stored in a first sector 40 and a third sector 40 of a track and a second command 61 is stored in the second sector 40 of the track, with the first, second, and third sectors 40 being consecutive in the track, the TBE bits for these two commands are set if both commands are to be erased from the medium 32. The optical medium drive 30 erases the first, second, and third sectors 40 consecutively instead of erasing the first and third sectors 40 and then erasing the second sector 40. The TBE bits similarly allow the optical medium drive 30 to erase tracks consecutively instead of moving between nonadjacent tracks for erasing.

During system bootup, the controller 53 allocates a segment of the cache 17 for the map copy 50. The map copy 50 in the cache 17 provides fast updates to the controller 53. The map copy 50 on the medium 32 provides a master copy of the map 45 is update in the event of a catastrophic failure of the system, a system reboot, or a manual ejection of the medium 32 from the optical medium drive 30, and for portability to other systems. The map copy 50 is updated after the map 45.

The map copy 50 eliminates the need for seeking a look tip table on the medium 32 each time data is handled. When the medium 32 is loaded into the optical medium drive 30, the map 45 is copied into the map copy 50 of the cache 17. Each time the map 45 is updated, the update is also added to the map copy 50 in the cache 17. The map copy 50 allows the optical medium drive 30 to quickly look up each area to be written by selecting either a two-pass or a single pass and reducing the number of passes and seeks required to perform data functions.

Standard data management and defragmenting tools may be used to provide compatibility with platforms using such tools. Further, if the sectors 40 to be written contain both no data (erased) and existing data, the erase pass may be performed for the existing data areas only and eliminate the need to erase the entire area each time such a request is processed, even if the areas are non-sequential. Once the optical medium drive 30 completes this erase, the drive 30 writes to the sectors that were requested to be written to.

This structure of the medium 32 allows both specialized and standard data structures to be used with the optical medium drive 30. This allows for downward compatibility of the medium 32 for supporting existing medium standards.

Figure 6:
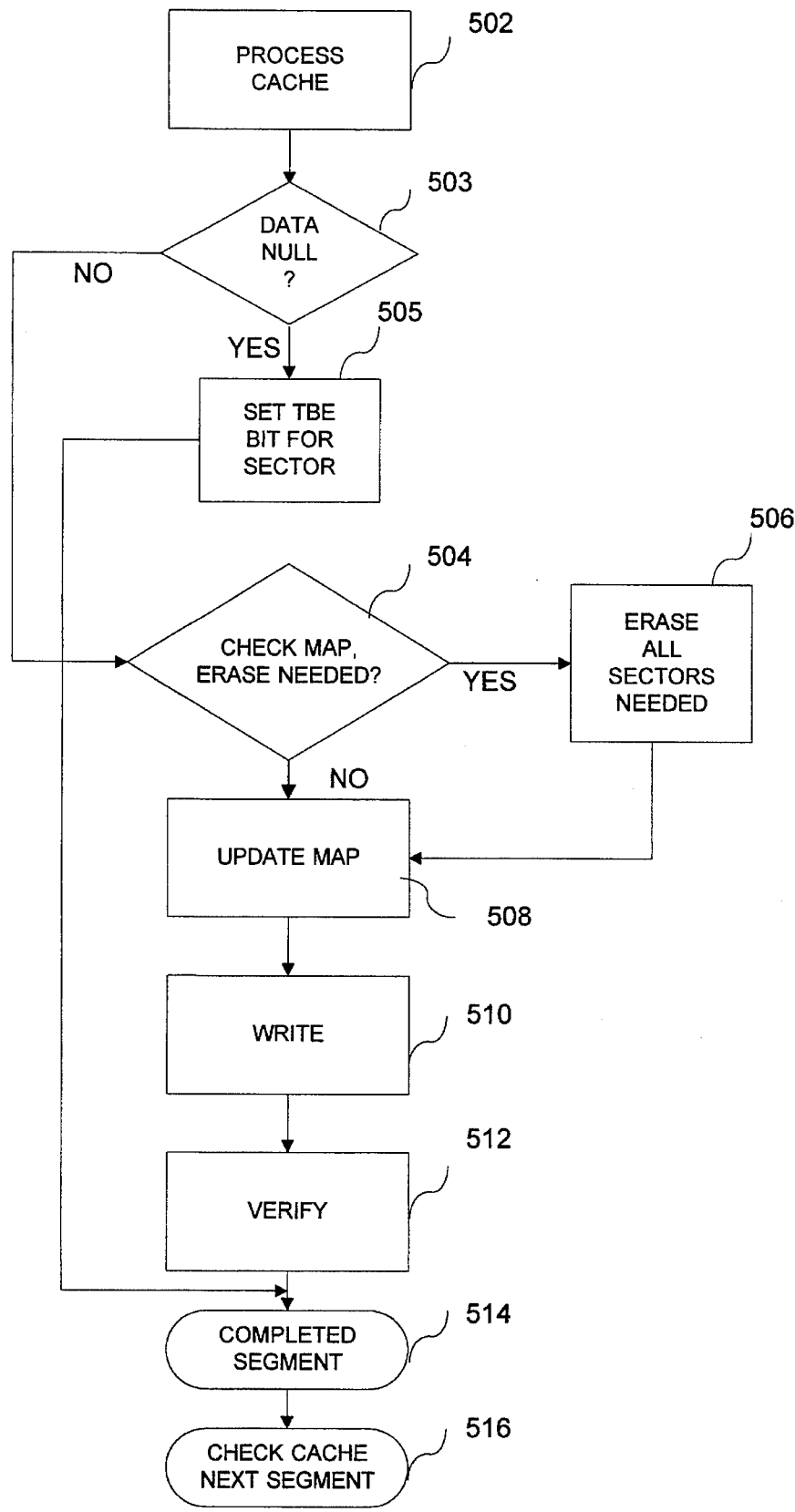
FIG. 6 is a flowchart illustrating a write operation of the microprocessor system of FIG. 1.

Referring to FIG. 6, there is shown a flowchart illustrating the write operation of the microprocessor system 10. When the operating system requests a write to the medium 32, the operating system processes 502 the cache 16. The controller 53 determines 503 if the data that is being written is null data. If so, the controller 53 sets 505 the TBE bits for the sectors to indicate such sectors are to be erased and sets the valid data bits to indicate the data in the sectors are not valid. The controller 53 completes 514 the segment as described later herein.

If the data to be written is not null data, the controller 53 checks 504 the map copy 50 to determine whether the area of the medium 32 being written to contains sectors 40 that are to be erased. If the map copy 50 contains valid data bits indicating that a sector 40 to be written has data therein, the sector 40 is erased before writing. For these sectors, a two-pass process is employed. For the other sectors that are to be written, a one-pass process is employed. Accordingly, the optical medium drive 30 rotates the medium 32 and erases 506 such sectors 45. The controller 53 updates 508 the map 45 by resetting the appropriate valid data bits in the map 45 and by resetting the TBE bit, if set. The operating system similarly updates the map copy 50. A sector 40 having a TBE bit set, but that was not erased, requires a pre-erase. The optical medium drive 30 writes 510 to the sectors 40 on the medium 32. The controller 53 may perform 512 a verification of the write by reading the written data and comparing the read data to the data that was written. If there is an error, the optical medium drive 30 performs a write with a pre-erase. After which, the write is completed 514 and the optical medium drive 30 returns a completed command signal to the host system 11. The operating system checks 516 the next command segment of the cache 16 for the next command.

As the operating system deletes data, the optical medium drive 30 adds the sectors that are to be erased to the data map 45 for erasing by setting the TBE bit for these sectors. Overwrite may be performed by using the standard two pass method. Of course, overwrite slows the process.

In another embodiment, the erasing of the sectors may occur during disconnects between the host system 11 and the optical medium drive 30. The host system 11 issues a write command to the optical medium drive 30. Upon receipt of the command, the optical medium drive 30 sends a command received to the host system 11 and disconnects by releasing the bus. The optical medium drive 30 checks the sectors to be erased and erases the sectors as necessary. The optical medium drive 30 updates the map. The host system 11 then provides data to the optical medium drive 30. After receipt of the data, the optical medium drive 30 send a data received command to the host system 11 and writes the data on the medium 32. The optical medium drive 30 sends a good status command to the host system 11 after a successful write.

Figure 7:
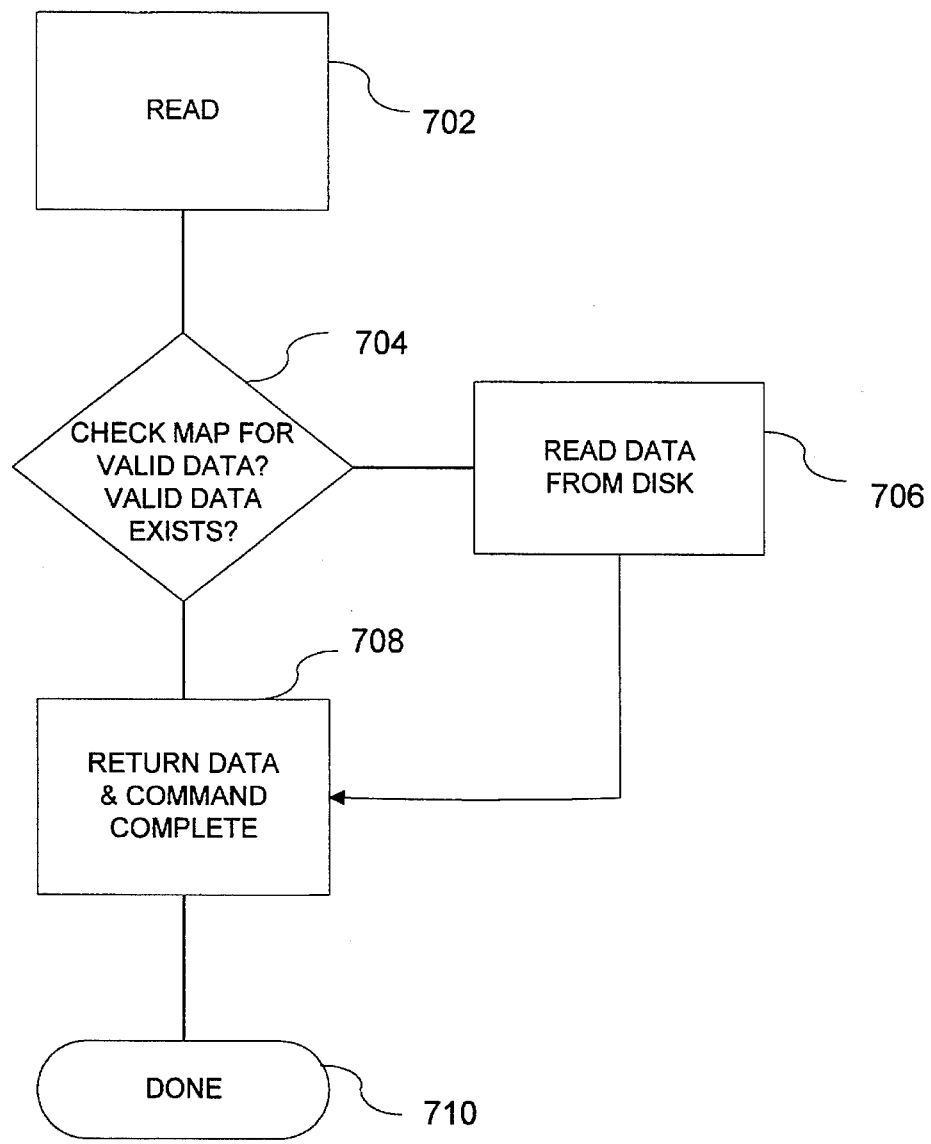
FIG. 7 is a flowchart illustrating a read operation of the microprocessor system of FIG. 1.

Referring to FIG. 7, there is shown a flowchart illustrating the read operation of the optical medium drive 30. When the optical medium drive 30 receives 702 a read command from the host system 11, the controller 53 checks 704 whether the data for the requested sector exists by reading the valid data bit for the sector from the map copy 50. If the valid data bit indicates that the data is valid, the controller 53 reads 706 the data from the optical storage medium 32. The optical medium drive 30 provides 708 the data to the data bus 31, if the data is valid and provides a data invalid command if the data is invalid. The optical medium drive 30 returns 708 a command complete signal to the host system 11 and ends 710 the read.

Figure 8:
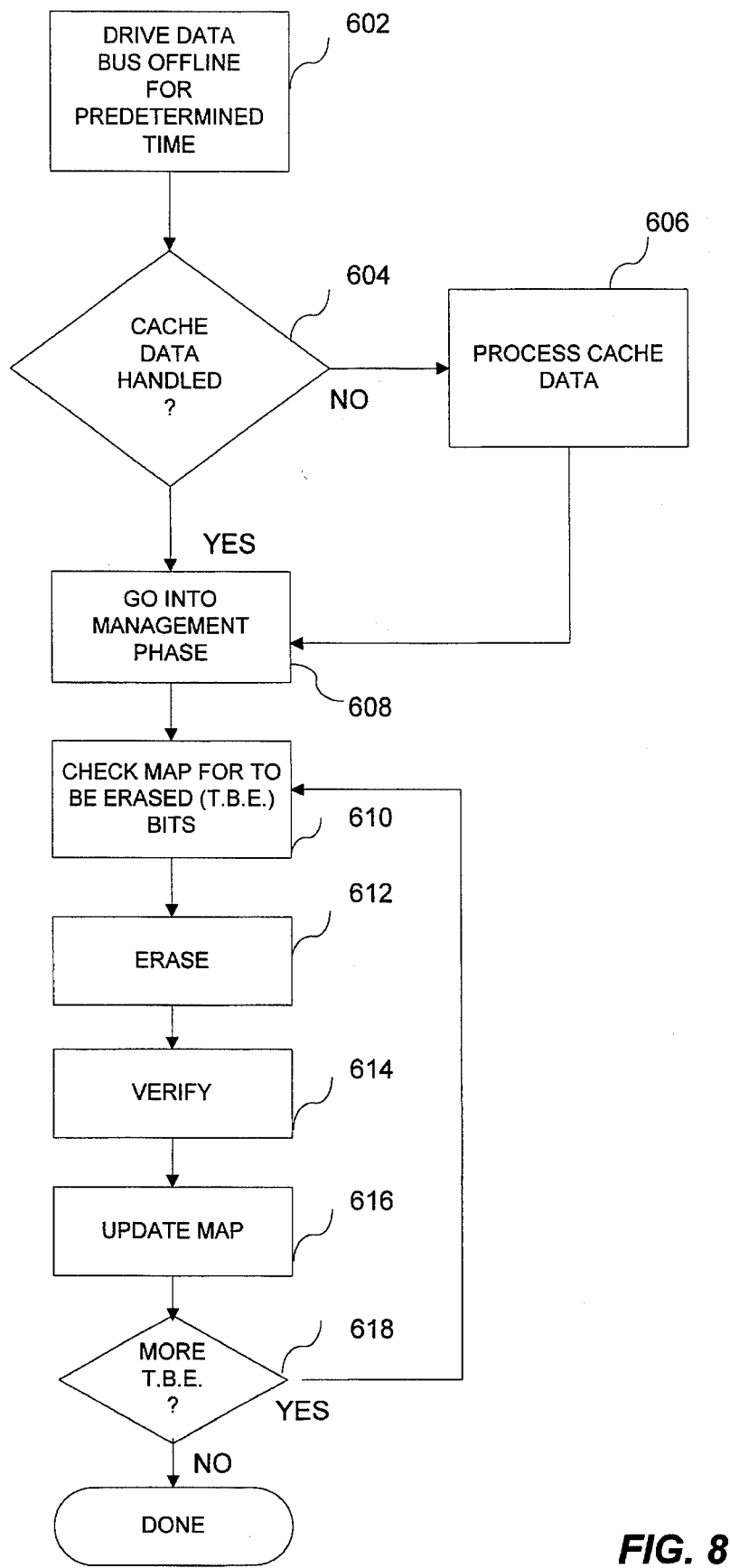
FIG. 8 is a flowchart illustrating art erase operation of the microprocessor system.

Referring to FIG. 8, there is shown a flowchart illustrating the erase operation of the microprocessor system 10. When the data bus 31 is free 602 for a predetermined time and the host system 11 is not using the optical medium drive 30, the optical medium drive 30 enters a data management phase, if there are sectors in the data map 45 that are to be erased. By using such free time, the erase management is substantially undetectable by the user. The controller 53 determines 604 whether the cache 17 contains data that has not been handled. If there is such data, the controller 53 processes 606 such cache data. The system enters 608 a management phase. The optical medium drive 30 reads 610 the map copy 50 to determine which sectors are to be erased by reading the to-be-erased (TBE) bits indicating that a sector 40 is to be erased. For each track, the optical medium drive 30 rotates the medium 32 to each sector 40 that is to be erased and erases 612 the sector 40. The controller 53 may perform a verification 614 of the erase by reading the sector 40 and comparing the read to the expected erased data.

As the drive erases 612 a sector 40, it updates 616 the map 45 by resetting the sector to-be-erased bit in the map 45 that corresponds to the erased sector 40. This process is repeated 618 until all sectors having a TBE bit set are erased and become ready to be written to at a later time without pre-erasing.

If a request is received from the host system, the optical medium drive 30 updates the medium 32 and the map 45. The optical medium drive 30 interrupts the data management process, assigns a priority to the request, and processes the request.

Figure 9:
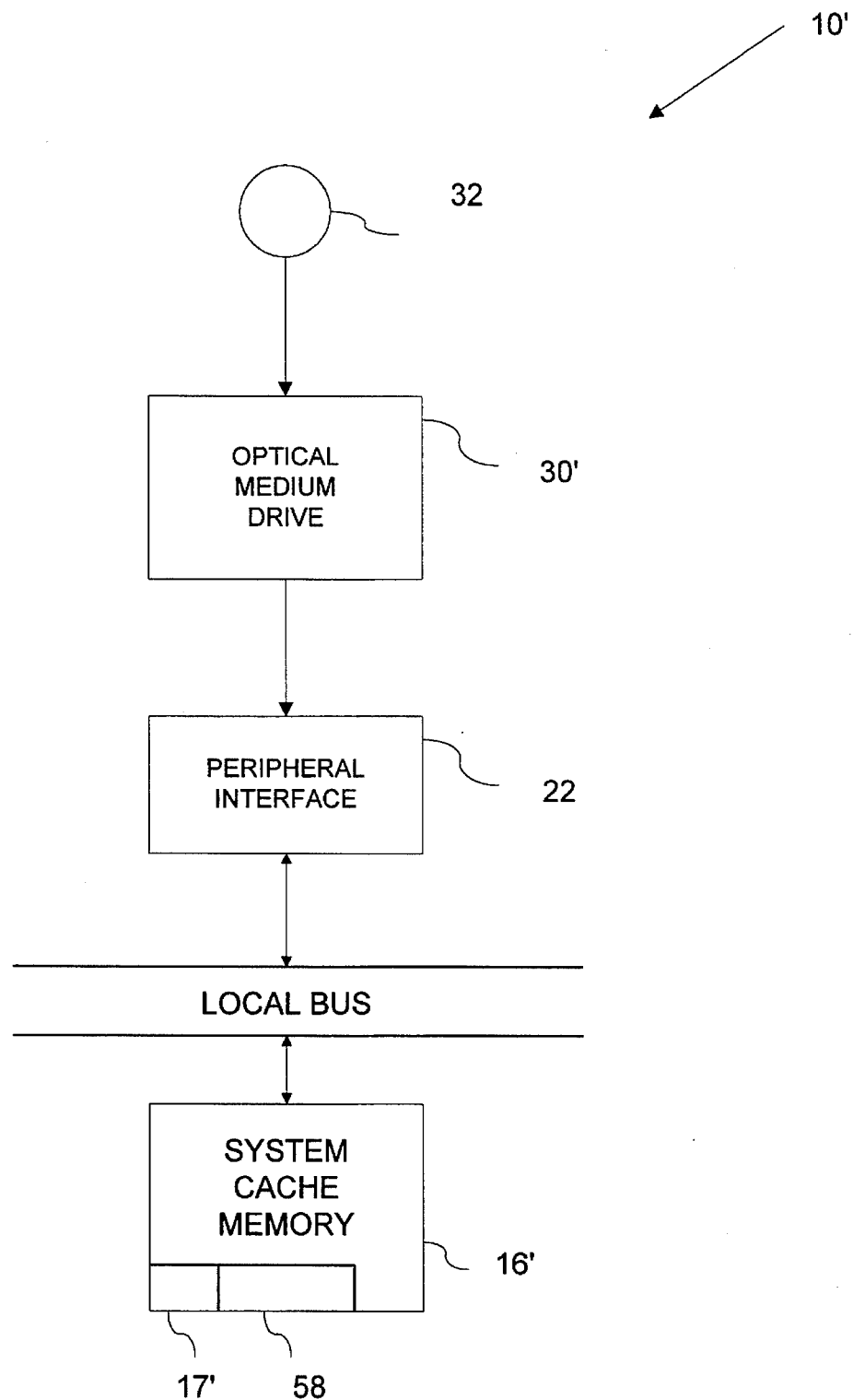
FIG. 9 is a block diagram illustrating a microprocessor system in accordance with a second embodiment of the present invention.

Referring to FIG. 9, there is shown a block diagram illustrating a microprocessor system 10' in accordance with a second embodiment of the invention. The system 10' is similar to the system 10 except that the data management functions are performed by a host system 11' instead of the optical medium drive 30 and the system cache memory 16' includes a cache 17' and the managing software 58, which is similar to the cache 17 in the drive 30. Accordingly, the map copy 50 is in the cache 17'. The host system 11' is like the host system 11 except for the system cache memory 16' and the cache 17'. The optical medium drive 30' is like the optical medium drive 30 except that it does not include the cache 17. During system bootup, the host system 11' allocates a segment of the cache 17 for the map copy 50. The map copy 50 in the cache 17' provides fast updates to the host system 11'.

Figure 10:
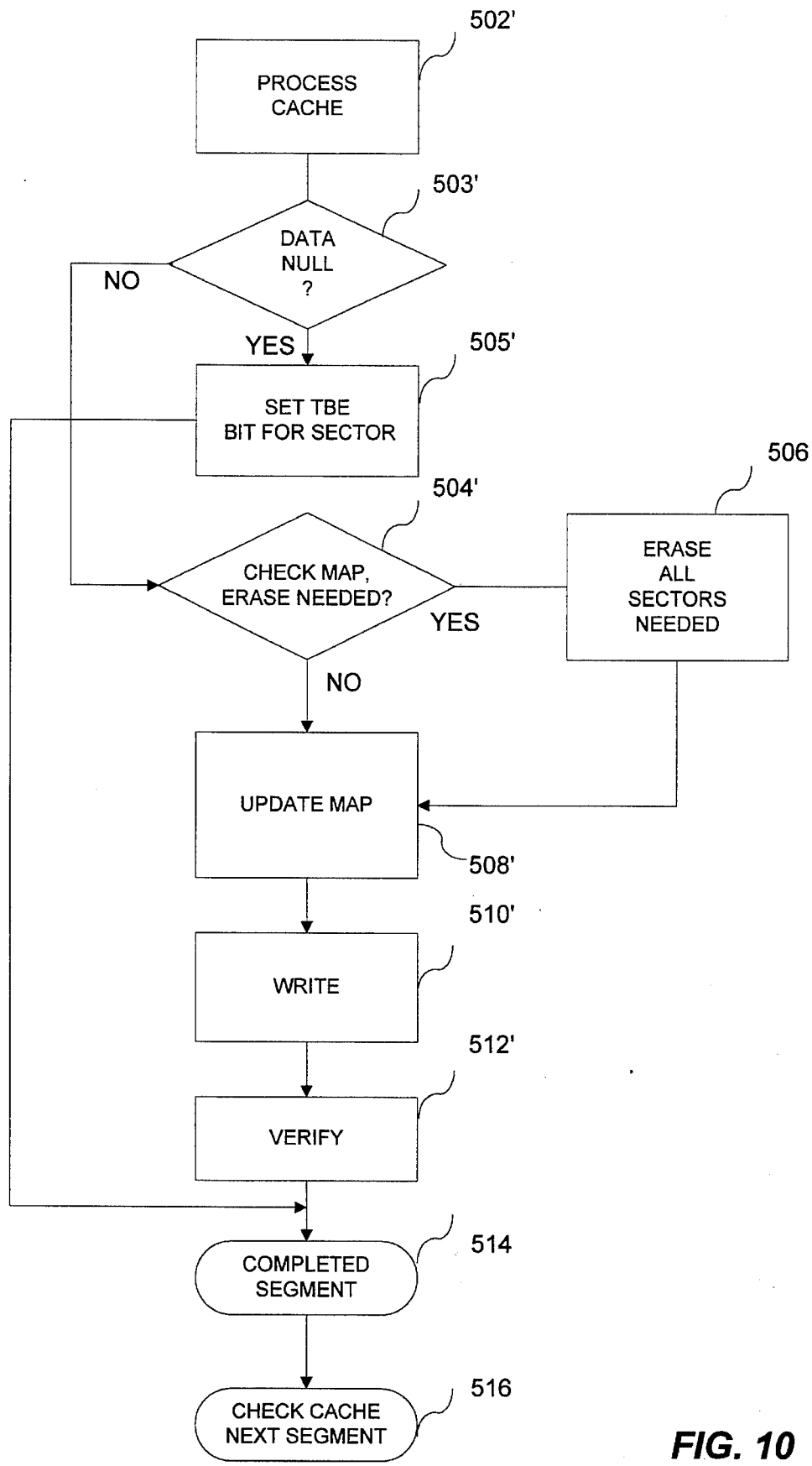
FIG. 10 is a flowchart illustrating a write operation of the microprocessor system of FIG. 9.

Referring to FIG. 10, there is shown a flowchart illustrating the write operation of the microprocessor system 10'. When the operating system requests a write to the medium 32, the host system 11' processes 502' the cache 17. The host system 11' determines 503' if the data that is being written is null data. If so, the host system 11' sets 505' the TBE bits for the sectors to indicate such sectors are to be erased and sets the valid data bits to indicate the data in the sectors are not valid. The host system 11' completes 514 the segment as described later herein.

If the data to be written is not null data, the host system 11' checks 504' the map copy 50 to determine whether the area of the medium 32 being written to contains sectors 40 that are to be erased. If the map copy 50 contains valid data bits indicating that a sector 40 to be written has data therein, the sector 40 is erased 506 before writing. For these sectors, a two-pass process is employed. For the other sectors to be written to, a one-pass process is employed. Accordingly, the optical medium drive 30' rotates the medium 32 and erases such sectors 45. The host system 11' updates 508' the map 45 by resetting the appropriate valid data bits in the map 45 and by resetting the TBE bit, if set. The optical medium drive 30' similarly updates the map copy 50. A sector 40 having a TBE bit set, but that was not erased, requires a pre-erase. The optical medium drive 30 writes 510 to the sectors 40 on the medium 32. The optical medium drive 30' may perform 512' a verification of the write by reading the written data and comparing the read data to the data that was written. If there is an error, the optical medium drive 30' performs a write with a pre-erase. After which, the write is completed 514. The host system 11' checks 516 the next command segment of the cache 16 for the next command.

As the system deletes data, the host system 11' adds the sectors that are to be erased to the data map 45 for erasing by setting the TBE bit for these sectors. Overwrite is possible by using the standard two pass method. Of course, overwrite slows the process.

Figure 11:
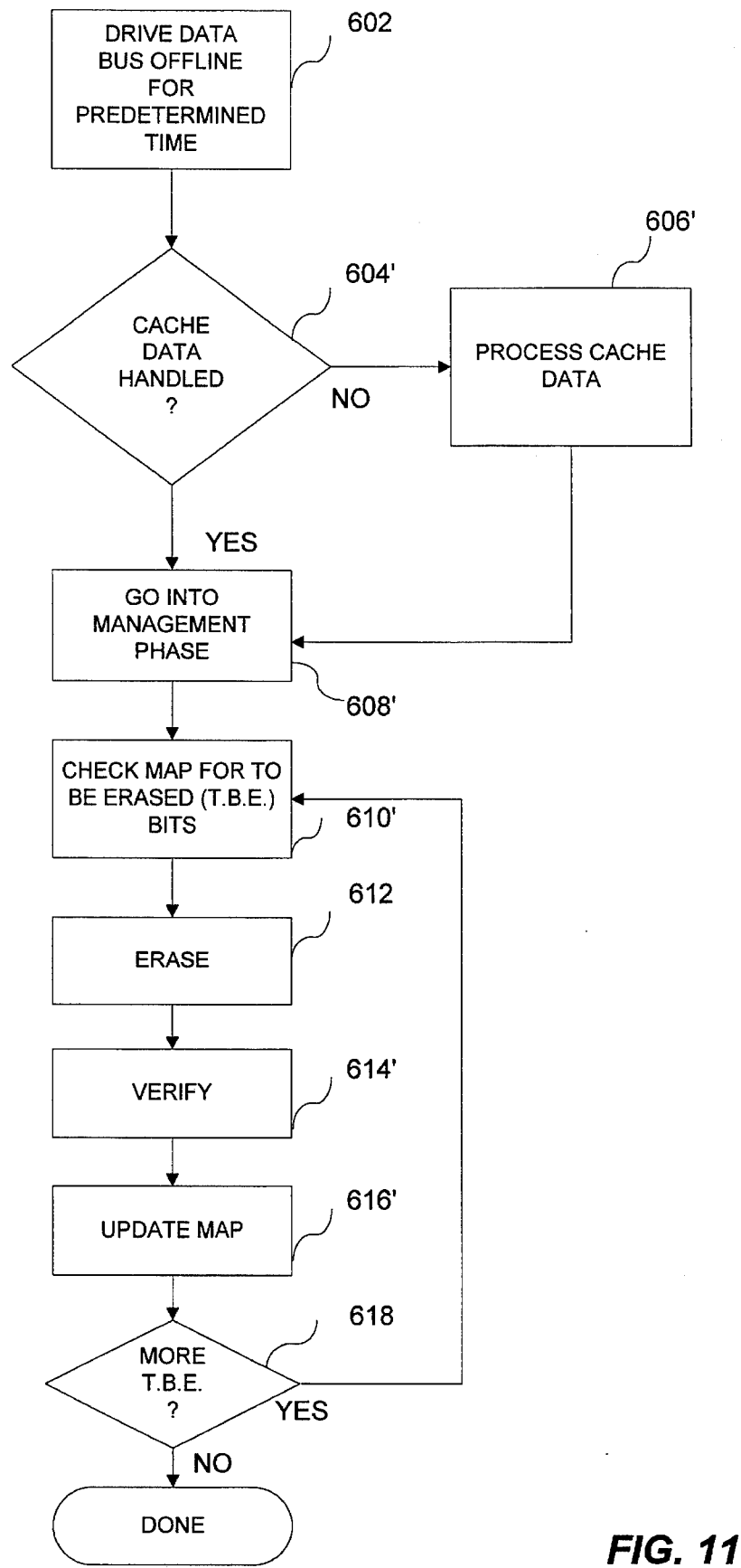
FIG. 11 is a flowchart illustrating an erase operation of the microprocessor system of FIG. 9.

Referring to FIG. 11, there is shown a flowchart illustrating the erase operation of the microprocessor system 10'. When the data bus 31 is free 602 for a predetermined time and the host system 11' is not using the optical medium drive 30', the drive 30' enters a data management phase, if there are sectors in the data map 45 that are to be erased. By using such free time, the erase management is substantially undetectable by the user. The host system 11' determines 604' whether the cache 17 contains data that has not been handled. If there is such data, the host system 11' processes 606' such cache data. The host system 11' enters 608' a management phase. The host system 11' determines 610' which sectors are to be erased by reading the map 45 for the to-be-erased (TBE) bits indicating that a sector 40 is to be erased. For each track, the optical medium drive 30' rotates the medium 32 to each sector 40 that is to be erased and erases 612 the sector 40. The optical medium drive 30' may perform a verification 614' of the erase by reading the sector 40 and comparing the read to the expected erased data.

As the optical medium drive 30' erases 612 a sector 40, the host system 11' updates 616' the map 45 by resetting the sector to-be-erased bit in the map 45 that corresponds to the erased sector 40. The host system 11' similarly updates the map copy 50. This process is repeated 618 until all sectors having a TBE bit set are erased and become ready to be written to at a later time without pre-erasing.

If a request is received within the host system, the optical medium drive 30' updates the medium 32 and the map 45.

The host system 11' interrupts the data management process, assigns a priority to the request, and processes the request.

Therefore, the system provides pre-erases of sectors during writes if the sector has data therein. The disk has a map of the sectors which indicates sectors that are to be erased during a data management process. The map is stored in the non-user data area 46 which allows the disk to be used in optical medium drives in systems not having the map implementation. The map copy 50 stored in a cache provides faster access to the map.

I claim:

1. An optical storage medium comprising:

a user data area having a plurality of sectors; and a map having first and second indicators corresponding to a portion of the plurality of sectors, the first indicator having a first logic state indicating that a corresponding sector contains stored data and having a second logic state indicating that the corresponding sector does not contain stored data, the second indicator having a first logic state indicating that a corresponding sector is to be erased, the first indicator being indicative of a number of erase and write sequences for storing data on the user data area and the second indicator providing for a pre-erase of the corresponding sector.

2. The optical storage medium as claimed in claim 1, wherein the pre-erase of the corresponding sector occurs during times when a host system is not using the optical storage medium for storage of information.

3. An apparatus for writing data on an optical storage medium having a user data area having a plurality of sectors and having a map having first and second indicators corresponding to a portion of the plurality of sectors, the first indicator having a first logic state indicating that a corresponding sector contains stored data and having a second logic state indicating that the corresponding sector does not contain stored data, the second indicator having a first logic state indicating that a corresponding sector is to be erased, the apparatus comprising:

a recorder coupled to the optical storage medium for erasing data and the indicators from the sectors and the map, respectively, in response to an erase command, and for writing data and the indicators on the sectors and the map, respectively, in response to a write command; and a processor coupled to the optical storage medium and to the recorder for providing both the erase command and the write command in response to the first indicator being in a first logic state, for providing the write command in response to the first indicator being in a second logic state, and for providing the erase command for a pre-erase of the corresponding sector in response to the second indicator being in a first logic state.

4. The apparatus as claimed in claim 3, wherein the second indicator provides for a pre-erase of the corresponding sector during times when the processor is not using the optical storage medium for storage of information.

5. The apparatus as claimed in claim 3, further comprising a memory coupled to the processor for storing a copy of the map, the copy of the map having third and fourth indicators corresponding to a portion of the plurality of sectors, the third indicator having a first logic state indicating that a corresponding sector contains stored data and having a second logic state indicating that the corresponding sector does not contain stored data, the fourth indicator having a first logic state indicating that a corresponding sector is to be erased.

6. A method for writing data on an optical storage medium having a user data area having a plurality of sectors and having a map having first and second indicators corresponding to a portion of the plurality of sectors, the first indicator having a first logic state indicating that a corresponding sector contains stored data and having a second logic state indicating that the corresponding sector does not contain stored data, the second indicator having a first logic state indicating that a corresponding sector is to be erased, the method comprising the steps of:

reading the map for first indicators corresponding to a first area of the medium;

erasing a sector in the first area of the medium having a corresponding first indicator in a first logic state;

writing to the first area of the medium;

storing the first logic state in the first indicator corresponding to the erased sector in the first area of the medium if such sector contains stored data written to the first area of the medium;

storing the second logic state in the first indicator corresponding to the erased sector in the first area of the medium if such sector does not contain stored data written to the first area of the medium;

reading the map for second indicators corresponding to a second area of the medium; and erasing a sector in the second area of the medium having a corresponding second indicator in the first logic state.

7. The method of claim 6, further comprising the steps of:

interrupting the reading of the map for second indicators corresponding to a second area of the medium, if a request is received during the reading of the map for second indicators; and interrupting the erasing of the sector in the second area of the medium having a corresponding second indicator in the first logic state, if a request is received during the erasing of the sector in the second area of the medium.

8. The method of claim 6, wherein the second indicator has a second logic state indicating that a corresponding sector is not to be erased, the method further comprising the step of:

storing the second logic state in the second indicator corresponding to the erased sector in the second area of the medium.

9. A method for writing data on an optical storage medium having a user data area having a plurality of sectors and having a map having first and second indicators corresponding to a portion of the plurality of sectors, the first indicator having a first logic state indicating that a corresponding sector contains stored data and having a second logic state indicating that the corresponding sector does not contain stored data, the second indicator having a first logic state indicating that a corresponding sector is to be erased, the method comprising the steps of:

storing a copy of the map in memory, the copy of the map having third and fourth indicators corresponding to a portion of the plurality of sectors, the third indicator having a first logic state indicating that a corresponding sector contains stored data and having a second logic state indicating that the corresponding sector does not contain stored data, the fourth indicator having a first logic state indicating that a corresponding sector is to be erased;

reading the copy of the map for third indicators corresponding to a first area of the medium;

erasing a sector in the first area of the medium having a corresponding third indicator of the copy of the map in a first logic state;

writing to the first area of the medium;

storing the first logic state in the first indicator of the map corresponding to the erased sector in the first area of the medium if such sector contains stored data written to the first area of the medium;

storing the second logic state in the first indicator of the map corresponding to the erased sector in the first area of the medium if such sector does not contain stored data written to the first area of the medium;

reading the copy of the map for fourth indicators corresponding to a second area of the medium; and erasing a sector in the second area of the medium having a corresponding fourth indicator of the copy of the map in the first logic state.

10. The method of claim 9, wherein the second indicator has a second logic state indicating that a corresponding sector is not to be erased, the method further comprising the step of:

storing the second logic state in the second indicator corresponding to the erased sector in the second area of the medium.

11. The method of claim 9, further comprising the steps of:

interrupting the reading of the copy of the map for fourth indicators corresponding to a second area of the medium, if a request is received during the reading of the copy of the map for fourth indicators; and interrupting the erasing of the sector in the second area of the medium having a corresponding fourth indicator in the first logic state, if a request is received during the erasing of the sector in the second area of the medium.

12. The method of claim 11, further comprising the step of:

updating the copy of the map to match the map after storing the second logic state in the second indicator of the map corresponding to the erased sector in the second area of the medium.

* * * * *